(No Model.)
M. WILLIAMS.
THRASHING MACHINE.
No. 317,907. Patented May 12, 1885.
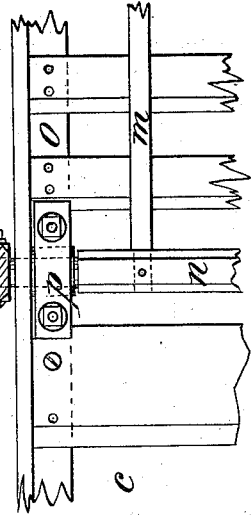
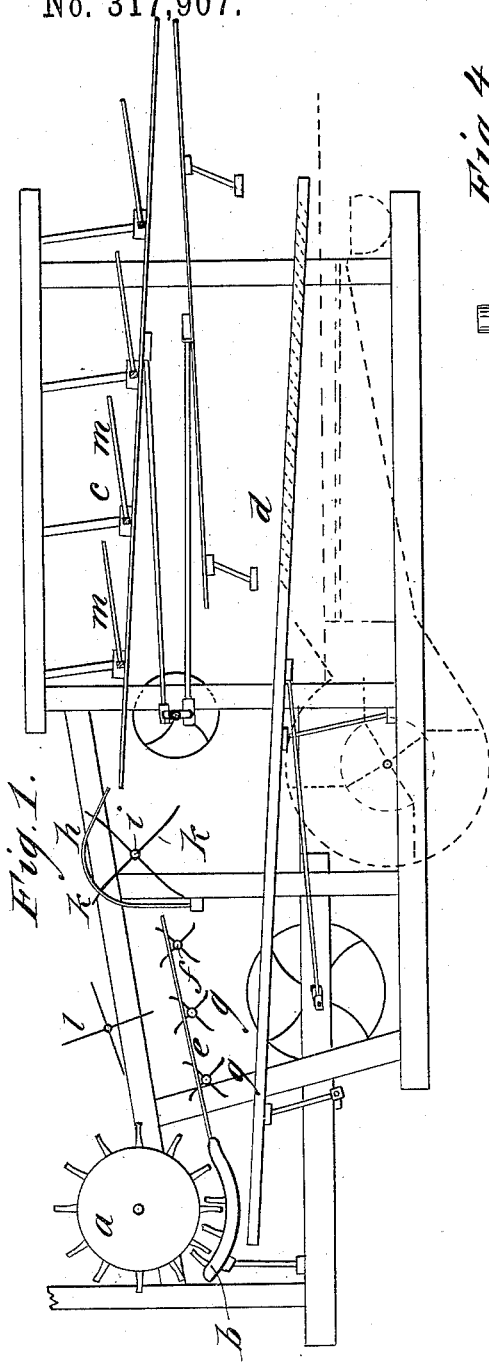
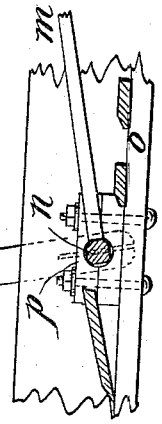
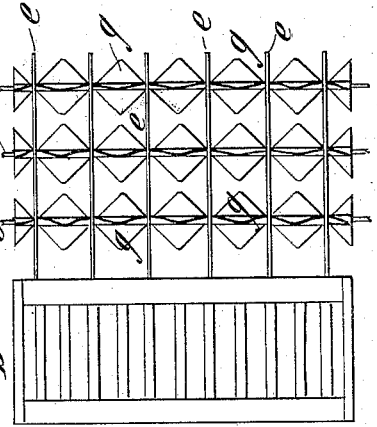
WITNESSES:
Donn Twitchell.
C. Sedgwick.
INVENTOR:
M. Williams
BY Munn & Co.
ATTORNEYS.

UNITED STATES PATENT OFFICE.

MARTIN WILLIAMS, OF ST. JOHNSVILLE, NEW YORK.

THRASHING-MACHINE.

SPECIFICATION forming part of Letters Patent No. 317,907, dated May 12, 1885.

Application filed July 10, 1884. (No model.)

*To all whom it may concern:*

Be it known that I, MARTIN WILLIAMS, of St. Johnsville, in the county of Montgomery and State of New York, have invented a new and useful Improvement in Thrashing-Machines, of which the following is a full, clear, and exact description.

Reference is to be had to the accompanying drawings, forming a part of this specification, in which similar letters of reference indicate corresponding parts in all the figures.

Figure 1 is a vertical longitudinal section of a thrashing-machine of my improved construction. Fig. 2 is a partial plan view. Fig. 3 is a detail side view, and Fig. 4 a detail plan view, of the straw-carrier.

In general construction the machine shown is of usual character, $a$ being the thrashing-cylinder, $b$ the concave, $c$ the straw carrier or separator, and $d$ the screen.

At the rear part of the concave $b$ tines $e$ $e$ are attached to form a grate, and they extend backward a suitable distance with a slight inclination upward. Crosswise of the machine and beneath tines $e$ are shafts $f$, provided with arms or beaters $g$, projecting between tines $e$, and curving backward to a point at their outer ends, so as to withdraw readily from the straw. The tines are made long enough to give space for three of the shafts $f$, preferably.

At the outer ends of the tines is a cross-bar carrying tines $h$, which rise upward and curve backward, so as to form a rising breast or grate, and beneath the breast is a cross-shaft, $i$, having arms $k$, similar to the shaft $e$ and arms $g$, except that the arms $k$ are longer.

In the operation of the machine the straw from the cylinder passes upon the grate of tines $e$, and the rotation of shafts $f$ causes the arms or beaters $g$ to raise and toss the straw while moving it backward, the movement being assisted by an ordinary beater, $l$, above. When the straw reaches the tines $h$, it is lifted by beaters $k$ and tossed upon the carrier $c$. These operations thoroughly open the straw so that the grain readily separates therefrom, especially at the rising breast, where the effect is to turn the straw over, and the separation is further facilitated by the flexibility of the tines, which are unattached at their outer ends.

The carrier or separator $c$ has beaters $m$ on cross-shafts $n$, as usual. Heretofore the side bars, $o$, of the separator have been made thick enough to be bored for reclining rings as bearings for the shafts $n$. The separator of this construction was heavy, and the bearings could not be tightly fitted. To avoid this great weight and facilitate construction, I use light side bars, $o$, and provide separate boxes $p$ for the journals of the shafts $n$. These can be accurately placed and the bearings kept tight at all times.

Having thus described my invention, I claim as new and desire to secure by Letters Patent—

The combination, with the thrashing-cylinder and the concave, of the series of upwardly-inclining flexible tines $e$, extending from the rear edge of the concave, a series of rotary shafts journaled below said tines, and provided with beating-arms extending up through the spaces between the said tines, the tines $h$, at the rear end of tines $e$, extending upward and rearward, and the rotary shaft $i$, having beating-arms $k$, extending up between the tines $h$, substantially as set forth.

MARTIN WILLIAMS.

Witnesses:
CHARLES EIGENBROAETT,
OTIS WILLIAMS.